United States Patent
Takeuchi

(10) Patent No.: US 6,642,971 B2
(45) Date of Patent: Nov. 4, 2003

(54) IMAGE DISPLAY APPARATUS, METHOD OF DISPLAYING IMAGES, IMAGE PROCESSING APPARATUS, AND METHOD OF PROCESSING IMAGES

(75) Inventor: Kesatoshi Takeuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 422 days.

(21) Appl. No.: 09/778,798

(22) Filed: Feb. 8, 2001

(65) Prior Publication Data

US 2001/0024242 A1 Sep. 27, 2001

(30) Foreign Application Priority Data

Feb. 17, 2000 (JP) ........................................ 2000-039105

(51) Int. Cl.$^7$ ................................................. H04N 3/23
(52) U.S. Cl. ........................ 348/746; 348/580; 353/69; 345/647
(58) Field of Search ................................. 348/745, 746, 348/781, 580, 806, 807, 189; 353/69, 70; 345/645–647, 660–665

(56) References Cited

U.S. PATENT DOCUMENTS 5,576,774 A * 11/1996 Hosoi et al. ................. 348/745
6,219,011 B1 * 4/2001 Aloni et al. ..................... 345/1
6,339,434 B1 * 1/2002 West et al. ................... 345/667
6,367,933 B1 * 4/2002 Chen et al. ..................... 353/69

FOREIGN PATENT DOCUMENTS

| JP | A 59-71563 | 4/1984 |
| JP | A 6-168326 | 6/1994 |
| JP | A 7-303029 | 11/1995 |
| JP | A 9-107468 | 4/1997 |
| JP | A 10-171045 | 6/1998 |
| JP | A 11-341351 | 12/1999 |

* cited by examiner

Primary Examiner—Victor R. Kostak
(74) Attorney, Agent, or Firm—Oliff & Berridge, PLC

(57) ABSTRACT

The technique of the present invention effectively relieves potential deterioration of the picture quality due to an interpolating process carried out simultaneously with a skipping process. When a skipping rate of the original image is set in at least one of a horizontal direction and a vertical direction, an image display apparatus of the present invention carries out a skipping process at selected positions in the at least one of the horizontal direction and the vertical direction, and simultaneously carries out interpolation on non-skipped pixels adjacent to skipped pixel, thereby generating an interpolated image. The image display apparatus subsequently carries out a filtering process on the interpolated image, the filtering process being carried out with a spatial low pass filter and a spatial high pass filter which are used substantially in this sequence.

25 Claims, 7 Drawing Sheets

ORIGINAL IMAGE (DV0)

INTERPOLATED IMAGE (DV1)

*Fig.5(a)* DV0 (ORIGINAL IMAGE)
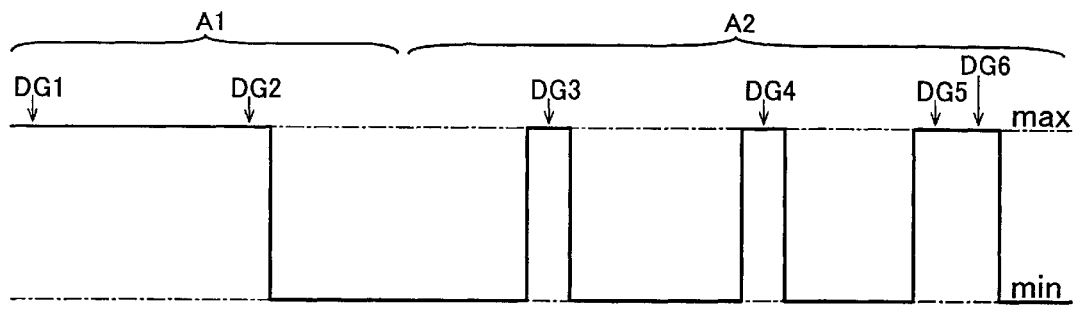
*Fig.5(b)* DV1 (INTERPOLATED IMAGE)
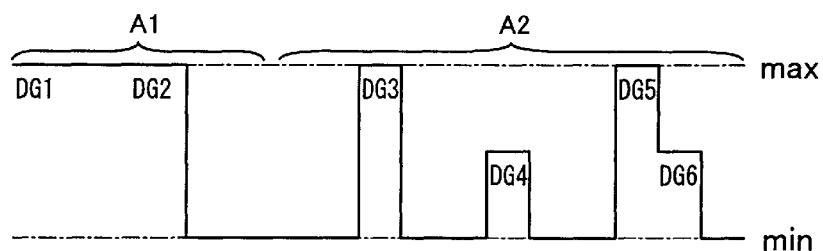
*Fig.5(c)* DV2 (IMAGE AFTER 1ST FILTERING PROCESS)
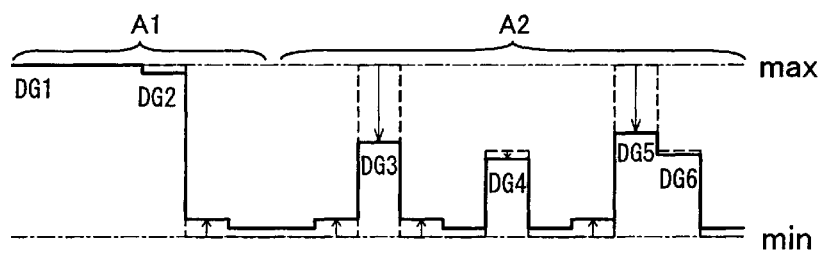
*Fig.5(d)* DV3 (IMAGE AFTER 2ND FILTERING PROCESS)
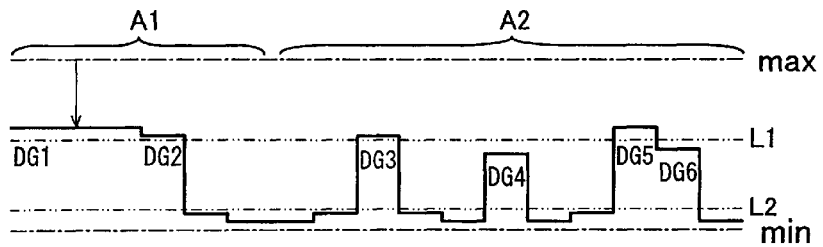
*Fig.5(e)* DV4 (IMAGE AFTER ADJUSTMENT OF CONTRAST)
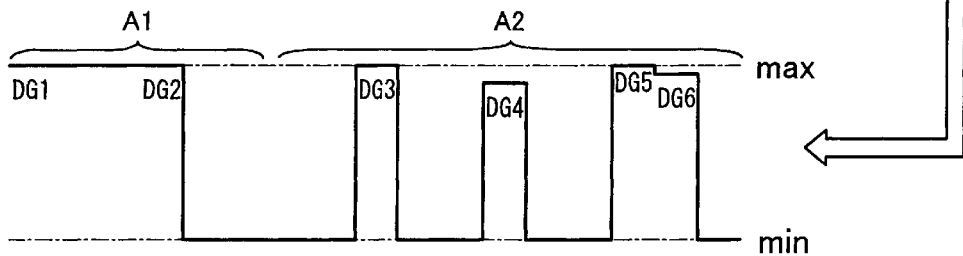

| SETTINGS | 1ST FILTERING COEFFICIENT | 2ND FILTERING COEFFICIENT | CONTRAST COMPENSATION VALUE |
|---|---|---|---|
| ADJ1 | FT1a | FT2a | CPa |
| ADJ2 | FT1b | FT2b | CPb |
| ADJ3 | FT1c | FT2c | CPc |
| ADJ4 | FT1d | FT2d | CPd |

IMAGE DISPLAY APPARATUS, METHOD OF DISPLAYING IMAGES, IMAGE PROCESSING APPARATUS, AND METHOD OF PROCESSING IMAGES

BACKGROUND OF THE INVENTION

1. Field of the Invention

The present invention relates to an image processing technique and more specifically a technique of adjusting an interpolated image.

2. Description of the Related Art

In an image display apparatus, adjustment of images are sometimes required to convert given original images into those suitable for an image display section. For example, if the resolution of an original image is greater than the displayable resolution of the image display section, contraction of the original image is required. In a concrete example, when an input original image of SXGA is displayed by the image display section that is capable of displaying images of XGA, the original image is to be contracted.

For contraction of the original image, the original image generally undergoes a skipping process. An interpolating process is often carried out simultaneously with the skipping process. One method applicable for the skipping process selectively skips a group of pixels aligning in either the vertical direction or the horizontal direction (hereinafter referred to as a line image) in an image. One method applicable for the interpolating process carries out interpolation with regard to a line image adjoining to a line image of interest, which is the object of the skipping process. The interpolating process causes information regarding pixels of interest, which are the object of the skipping process, to be left in a resulting image after the skipping process. For example, if one white line image is present in a black image and this white line image is the object of the skipping process, the interpolating process generates a gray line image in the black image, so as to prevent the line information from disappearing from a resulting image.

The resulting image subjected to the selective skipping process and the interpolating process disadvantageously has the deteriorating picture quality. In the above example, the white line image included in the black image is reproduced as a gray line image included in the resulting black image. This does not accurately reproduce the information with regard to the original image.

SUMMARY OF THE INVENTION

The object of the present invention is thus to provide a technique that effectively relieves potential deterioration of the picture quality due to an interpolating process carried out simultaneously with a skipping process.

At least part of the above and the other related objects is attained by an image display apparatus, which includes: an image adjustment section that adjusts a given original image; and an image display section that displays the adjusted image. The image adjustment section has: an interpolating process section that, when a skipping rate of the original image is set in at least one of a horizontal direction and a vertical direction, carries out a skipping process at selected positions in the at least one of the horizontal direction and the vertical direction, and simultaneously carries out interpolation on non-skipped pixels adjacent to skipped pixel, thereby generating an interpolated image; and a filtering section that carries out a filtering process on the interpolated image, the filtering process being carried out with a spatial low pass filter and a spatial high pass filter which are used substantially in this sequence.

The image display apparatus has the filtering section, which adjusts the distribution of pixel values in the interpolated image created by the selective skipping process and the interpolating process to a distribution similar to the distribution of pixel values in the original image. This arrangement effectively relieves potential deterioration of the picture quality of the interpolated image.

In accordance with one preferable application of the image display apparatus of the present invention, the filtering process uses one composite image filter which is obtained by combining the spatial low pass filter with the spatial high pass filter.

This arrangement ensures the quick filtering process carried out in the filtering section.

In accordance with one preferable embodiment of the image display apparatus of the present invention, the image adjustment section further includes a contrast compensation section that compensates contrast of a resulting image processed by the filtering section. The filtering section has: a first image filtering section that carries out a filtering process with the spatial low pass filter; and a second image filtering section that carries out a filtering process with the spatial high pass filter. The first image filtering section and the second image filtering section carry out the filtering process with a selected one of a plurality of first filtering coefficients and a selected one of a plurality of second filtering coefficients, respectively, the selected first filtering coefficient and the selected second filtering coefficient being related to each other. The contrast compensation section carrying out the compensating with a selected one of a plurality of contrast compensation values, the selected contrast compensation value being related to the selected first and second filtering coefficients. Available combinations of the selected first and second filtering coefficients and the selected contrast compensation value is determined in advance.

The arrangement of mutually mapping the first filtering coefficient, the second filtering coefficient, and the contrast compensation value to one another facilitates the specification of the filtering processes carried out in the filtering section with the first and the second image filters as well as the processing carried out in the contrast compensation section.

In accordance with another preferable embodiment of the image display apparatus of the present invention, the image adjustment section further includes a contrast compensation section that compensates contrast of a resulting image processed by the filtering section. The filtering section has: a first image filtering section that carries out a filtering process with the spatial low pass filter; and a second image filtering section that carries out a filtering process with the spatial high pass filter. The first image filtering section and the second image filtering section carrying out the filtering process with a selected one of a plurality of first filtering coefficients and a selected one of a plurality of second filtering coefficients, respectively. The contrast compensation section carrying out the compensating with a selected one of a plurality of contrast compensation values. The selected second filtering coefficient and contrast compensation value are related to each other in advance, whereas the first filtering coefficient is selected independently of the second filtering coefficient and the contrast compensation value.

The arrangement of mutually mapping the second filtering coefficient and the contrast compensation value to each other facilitates the specification of the filtering process carried out in the filtering section with the second image filter as well as the processing carried out in the contrast compensation section. Compared with the apparatus of the above configuration, the configuration of independently selecting the first filtering coefficient enables a greater number of different processes to be carried out in the filtering section and the contrast compensation section.

The image display apparatus having any of the above configurations may be a projection display apparatus that displays a projected image. In this case, the interpolating process section carries out the skipping process to correct a keystone distortion of the projected image.

In the case where the image display apparatus is a projection display apparatus, a keystone distortion (that is, a trapezoidal distortion) often arises in the resulting projected image, based on the positional relationship between the projection display apparatus and the screen. The skipping process is generally required to correct such a keystone distortion. The image display apparatus of the present invention effectively relieves potential deterioration of the picture quality due to the skipping and interpolating processes carried out to correct the keystone distortion.

The present invention is also directed to a method of displaying an image, which includes the steps of: adjusting a given original image; and displaying the adjusted image. The step of adjusting the original image includes the steps of: when a skipping rate of the original image is set in at least one of a horizontal direction and a vertical direction, carrying out a skipping process at selected positions in the at least one of the horizontal direction and the vertical direction, and simultaneously carrying out interpolation on non-skipped pixels adjacent to skipped pixels, thereby generating an interpolated image; and carrying out a filtering process on the interpolated image, the filtering process being carried out with a spatial low pass filter and a spatial high pass filter which are used substantially in this sequence.

This method exerts the same functions and advantages as those discussed above with regard to the image display apparatus, and relieves potential deterioration of the picture quality due to the skipping and interpolating processes.

The present invention is further directed to an image processing apparatus, which has an image adjustment section that adjusts a given original image. The image adjustment section includes: an interpolating process section that, when a skipping rate of the original image is set in at least one of a horizontal direction and a vertical direction, carries out a skipping process at selected positions in the at least one of the horizontal direction and the vertical direction, and simultaneously carries out interpolation on non-skipped pixels adjacent to skipped pixel, thereby generating an interpolated image; and a filtering section that carries out a filtering process on the interpolated image, the filtering process being carried out with a spatial low pass filter and a spatial high pass filter which are used substantially in this sequence.

The present invention is also directed to a method of processing an image, which has the step of adjusting a given original image. This step includes the steps of: when a skipping rate of the original image is set in at least one of a horizontal direction and a vertical direction, carrying out a skipping process at selected positions in the at least one of the horizontal direction and the vertical direction, and simultaneously carrying out interpolation on non-skipped pixels adjacent to skipped pixels, thereby generating an interpolated image; and carrying out a filtering process on the interpolated image, the filtering process being carried out with a spatial low pass filter and a spatial high pass filter which are used substantially in this sequence.

The image processing apparatus and the corresponding method exert the same functions and advantages as those discussed above with regard to the image display apparatus and the corresponding method, and relieves potential deterioration of the picture quality due to the skipping and interpolating processes.

The present invention is also directed to a computer program product for processing an image, which includes: a computer readable medium; and a computer program, stored on the computer readable medium, for adjusting a given original image. The computer program has: a program for causing a computer, when a skipping rate of the original image is set in at least one of a horizontal direction and a vertical direction, to carry out a skipping process at selected positions in the at least one of the horizontal direction and the vertical direction, and simultaneously to carry out interpolation on non-skipped pixels adjacent to skipped pixels, thereby generating an interpolated image; and a program for causing the computer to carry out a filtering process on the interpolated image, the filtering process being carried out with a spatial low pass filter and a spatial high pass filter which are used substantially in this sequence.

The computer program product exert the same functions and advantages as those discussed above with regard to the image display apparatus, the image processing apparatus and the corresponding methods, and relieves potential deterioration of the picture quality due to the skipping and interpolating processes.

The technique of the present invention is attained by a variety of applications including an image display apparatus and its corresponding method, an image processing apparatus and its corresponding method, computer programs to attain the functions of these apparatuses and the methods, recording media in which such computer programs are recorded, and data signals that include such computer programs and are embodied in carrier waves.

These and other objects, features, aspects, and advantages of the present invention will become more apparent from the following detailed description of the preferred embodiments with the accompanying drawings.

BRIEF DESCRIPTION OF THE DRAWINGS

FIGS. 5(a) through 5(e) shows examples of digital video signals DV0 through DV4;

DESCRIPTION OF THE PREFERRED EMBODIMENTS

A. General Structure of Apparatus

Figure 1:
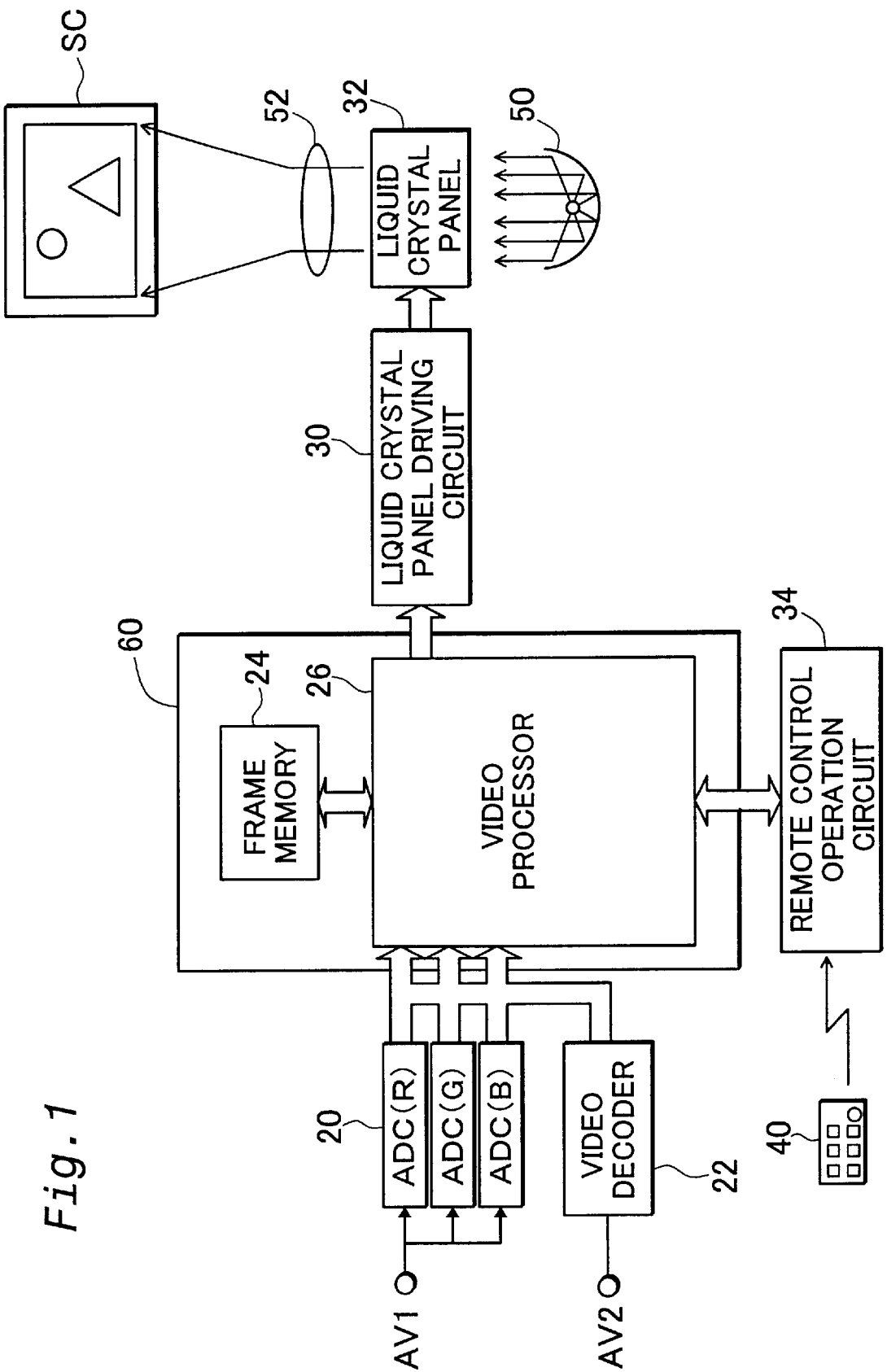
FIG. 1 is a block diagram illustrating the general structure of an image display apparatus in one embodiment of the present invention.

One mode of carrying out the present invention is described below as a preferred embodiment. FIG. 1 is a block diagram illustrating the general structure of an image display apparatus in one embodiment of the present invention. The image display apparatus is a projection display apparatus that projects an image on a screen SC. The image display apparatus is a computer system that includes an A-D converter 20, a video decoder 22, a frame memory 24, a video processor 26, a liquid crystal panel driving circuit 30, a liquid crystal panel 32, and a remote control operation circuit 34. The frame memory 24 and the video processor 26 are integrated as one integrated circuit 60 for image processing.

The image display apparatus also includes a lighting device 50 that illuminates the liquid crystal panel 32, and a projection optical system 52 that functions to project image light emitted from the liquid crystal panel 32 onto the screen SC. The liquid crystal panel 32 is used as a light valve (light modulator) that modulates the illumination light emitted from the lighting device 50. The liquid crystal panel 52, the lighting device 50, and the projection optical system 52 of this embodiment correspond to the image display section of the present invention.

Although not specifically illustrated, the image display apparatus actually has three liquid crystal panels 32 for three colors R, G, and B. Each of the circuits discussed below has the function of processing video signals of three colors. The lighting device 50 has a color light separating optical system that separates white light into three color lights, whereas the projection optical system 52 has a composite optical system that combines image lights of three colors to composite image light representing a color image. The structures of these optical systems included in the projection display apparatus are described in detail, for example, in JAPANESE PATENT LAID-OPEN GAZETTE No. 10-171045 filed by the applicant of the present invention and are thus not specifically described here.

The A-D converter 20 receives analog video signals AV1 output from personal computers, and the video decoder 22 receives analog video signals AV2 output from video recorders and televisions. One of the two analog video signals AV1 and AV2 is selectively used as an input video signal. The analog video signals AV1 and AV2 are respectively converted into digital video signals including video signal components of three colors by the A-D converter 20 and the video decoder 22. Digital video signals may be given into the image display apparatus, in addition to the analog video signals AV1 and AV2.

The video signal given into the video processor 26 is temporarily written in the frame memory 24, read from the frame memory 24, and is given to the liquid crystal panel driving circuit 30. The liquid crystal panel driving circuit 30 generates a driving signal to drive the liquid crystal panel 32 in response to the given video signal. The liquid crystal panel 32 modulates the illumination light in response to this driving signal.

The user inputs a variety of settings with regard to the image display through operations of the remote control 40. Although not specifically illustrated, the main body of the image display apparatus also has a diversity of keys and buttons to input the variety of settings with regard to the image display.

B. Internal Structure of Video Processor 26

Figure 2:
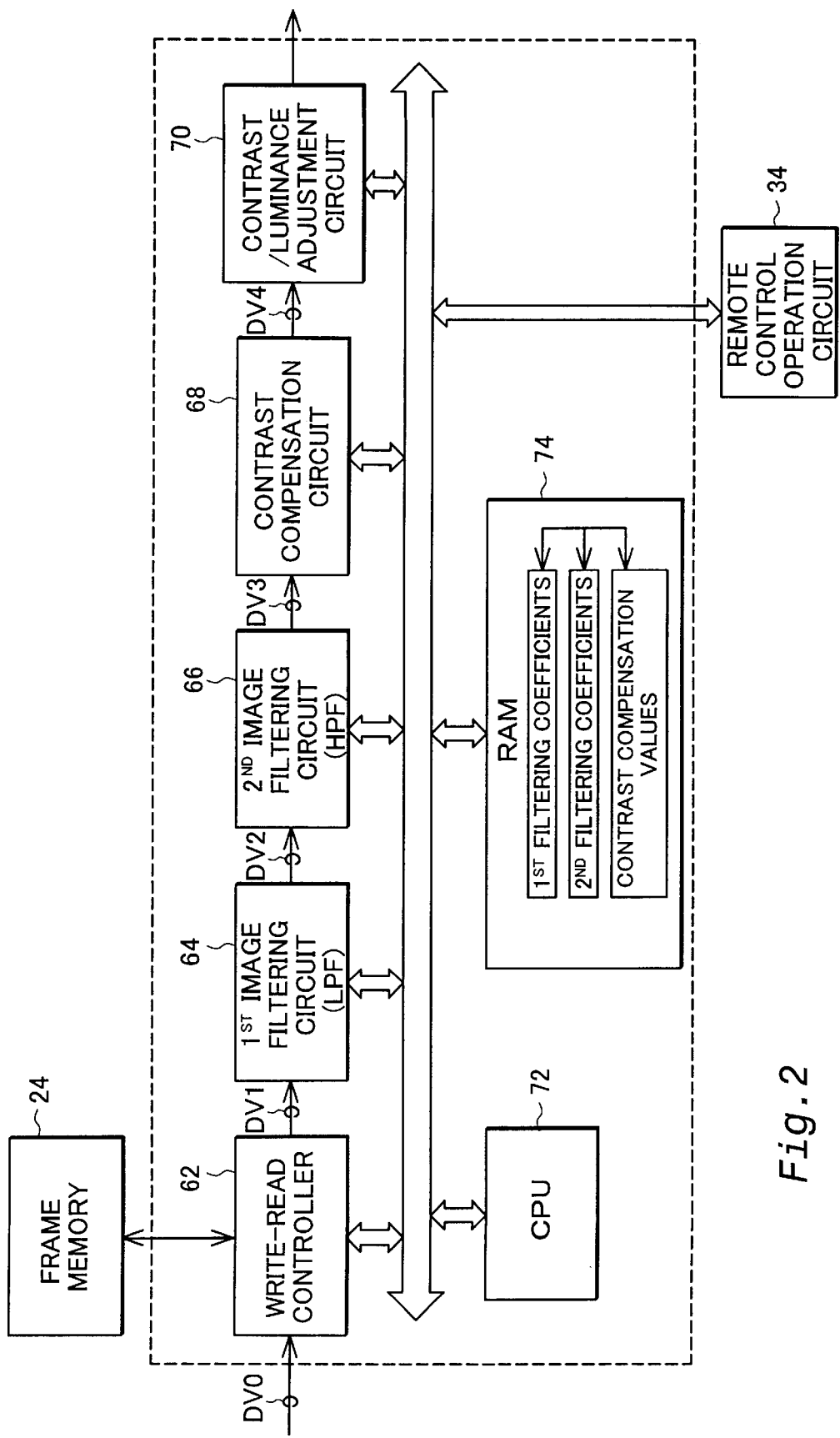
FIG. 2 is a block diagram illustrating the internal structure of a video processor 26.

FIG. 2 is a block diagram illustrating the internal structure of the video processor 26. The video processor 26 includes a write-read controller 62, a first image filtering circuit 64, a second image filtering circuit 66, a contrast compensation circuit 68, a contrast/luminance adjustment circuit 70, a CPU 72, and a RAM 74. The video processor 26 corresponds to the image adjustment section of the present invention.

The write-read controller 62 controls writing digital video signals DV0 provided from the A-D converter 20 and the video decoder 22 shown in FIG. 1 into the frame memory 24 and reading digital video signals DV1 from the frame memory 24. The write-read controller 62 carries out expansion and contraction processes of images. In the case of contraction of an image, the write-read controller 62 carries out the interpolating process simultaneously with the skipping process.

Figure 3A:
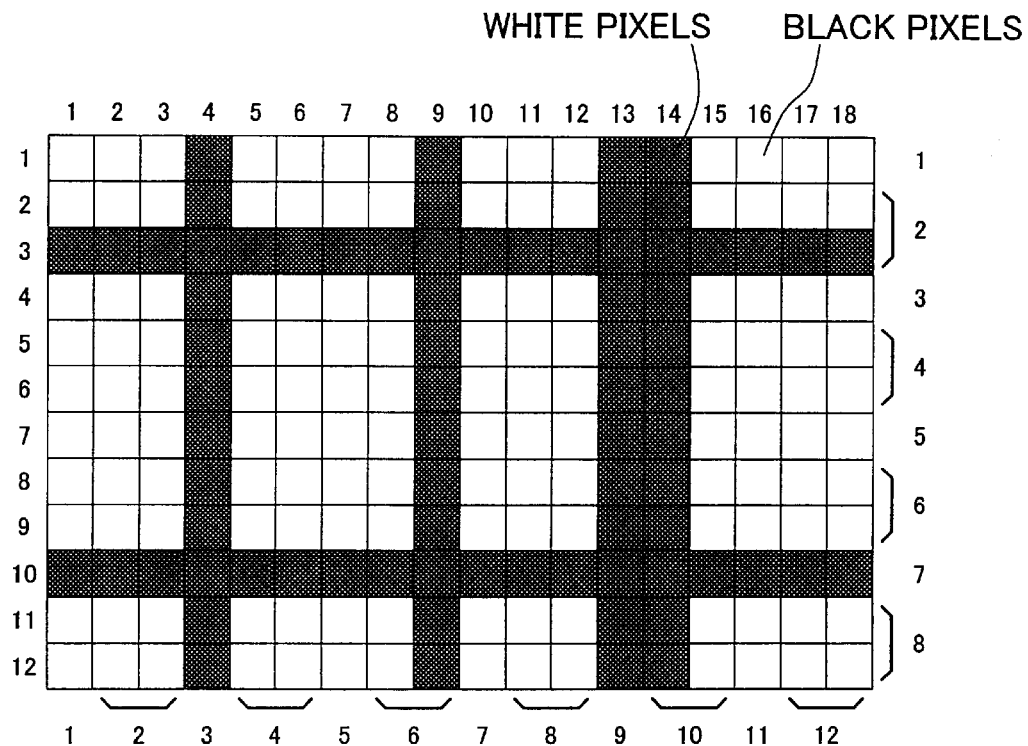
FIGS. 3(a) and 3(b) show the contraction process of an image carried out by a write-read controller 62.
Figure 3B:
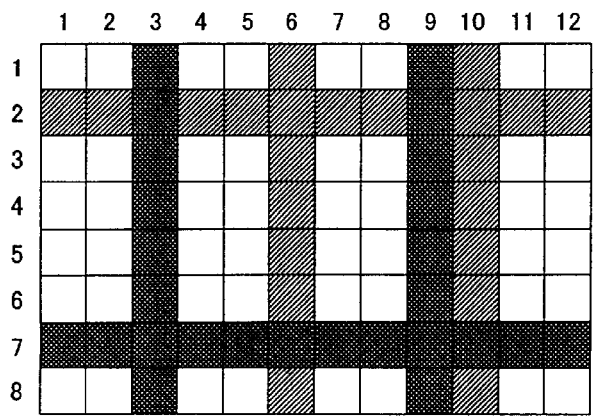

FIGS. 3(a) and 3(b) show the contraction process of an image carried out by the write-read controller 62. FIG. 3(a) shows an original image before the contraction process, that is, an image expressed by the digital video signal DV0. FIG. 3(b) shows an interpolated image after the contraction process, that is, an image expressed by the digital video signal DV1.

The original image shown in FIG. 3(a) has the size of 18×12 pixels and includes a figure of lattices. For convenience of illustration, cross-hatched pixels represent 'white' pixels having the maximum pixel value, whereas non-hatched pixels represent 'black' pixels having the minimum pixel value. When the vertical dimension and the horizontal dimension of the original image are respectively contracted to ⅔ (that is, to 12×8 pixels), in other words, when the skipping rate is ⅓ in both the vertical and the horizontal directions, the skipping process selectively deletes the line images at the rate of 1 to 3 both in the horizontal and in the vertical directions of the original image. The interpolating process is carried out simultaneously with this skipping process.

FIG. 3(b) shows an interpolated image obtained by contracting the original image. In this embodiment, line images on (3·m)-th columns and rows (where m denotes integers) are the object of the skipping process. Adjacent line images ((3·m−1)-th line images) adjoining to the target line images of the skipping process ((3·m)-th line images) are the object of the interpolating process. The interpolating process carried out in this embodiment averages the pixel values of the (3·m)-th line images and the (3·m−1)-th line images. The numerals shown on the upper side and the left side in the images of FIGS. 3(a) and 3(b) respectively denote column numbers and row numbers allocated to the columns and rows of the images. The numerals shown on the lower side and the right side in the original image of FIG. 3(a) correspond to the column numbers and the row numbers in the interpolated image of FIG. 3(b).

For example, the 'white' line image on the $4^{th}$ column included in the original image shown in FIG. 3(a) is not the object of the skipping process in the direction of columns, and accordingly forms the 'white' line image on the $3^{rd}$ column included in the interpolated image shown in FIG. 3(b). On the other hand, the 'white' line image on the $9^{th}$ column included in the original image is the object of the skipping process in the direction of columns, so that the 'black' line image on the $8^{th}$ column is the object of the interpolating process. The interpolating process causes the 'black' line image on the $8^{th}$ column included in the original image to form the 'gray' line image on the $6^{th}$ column included in the interpolated image.

The interpolated image is created by carrying out the skipping process at the selected positions according to the preset skipping rate with regard to the original image and simultaneously causing the specific pixels that are in the vicinity of the pixels of interest, which are the object of the skipping process, to undergo the interpolating process. As clearly understood from this explanation, the write-read controller 62 shown in FIG. 2 corresponds to the interpolating process section of the present invention.

In the interpolated image shown in FIG. 3(b), part of the lattice figure defined by the 'white' line images in the original image is formed by the 'gray' line images. This deteriorates the picture quality of the resulting image. The technique of the present invention carries out the filtering process to relieve the potential deterioration of the picture quality.

Referring back to FIG. 2, the digital video signal DV1 that is output from the write-read controller 62 and represents the interpolated image is subjected to the filtering processes carried out in the first image filtering circuit 64 and the second image filtering circuit 66. The first and the second image filtering circuits 64 and 66 of this embodiment are digital filters used to relieve potential deterioration of the picture quality due to the skipping and interpolating processes discussed above. The first image filtering circuit 64 functions as a low pass filter (LPF) to regulate the pixel values of a specific group of pixels having relatively high spatial frequencies, which are included in the input digital video signal DV1, and output a digital video signal DV2. The second image filtering circuit 66, on the other hand, functions as a high pass filter (HPF) to regulate the pixel values of a specific group of pixels having relatively low spatial frequencies, which are included in the digital video signal DV2, and output a digital video signal DV3.

Figure 4:
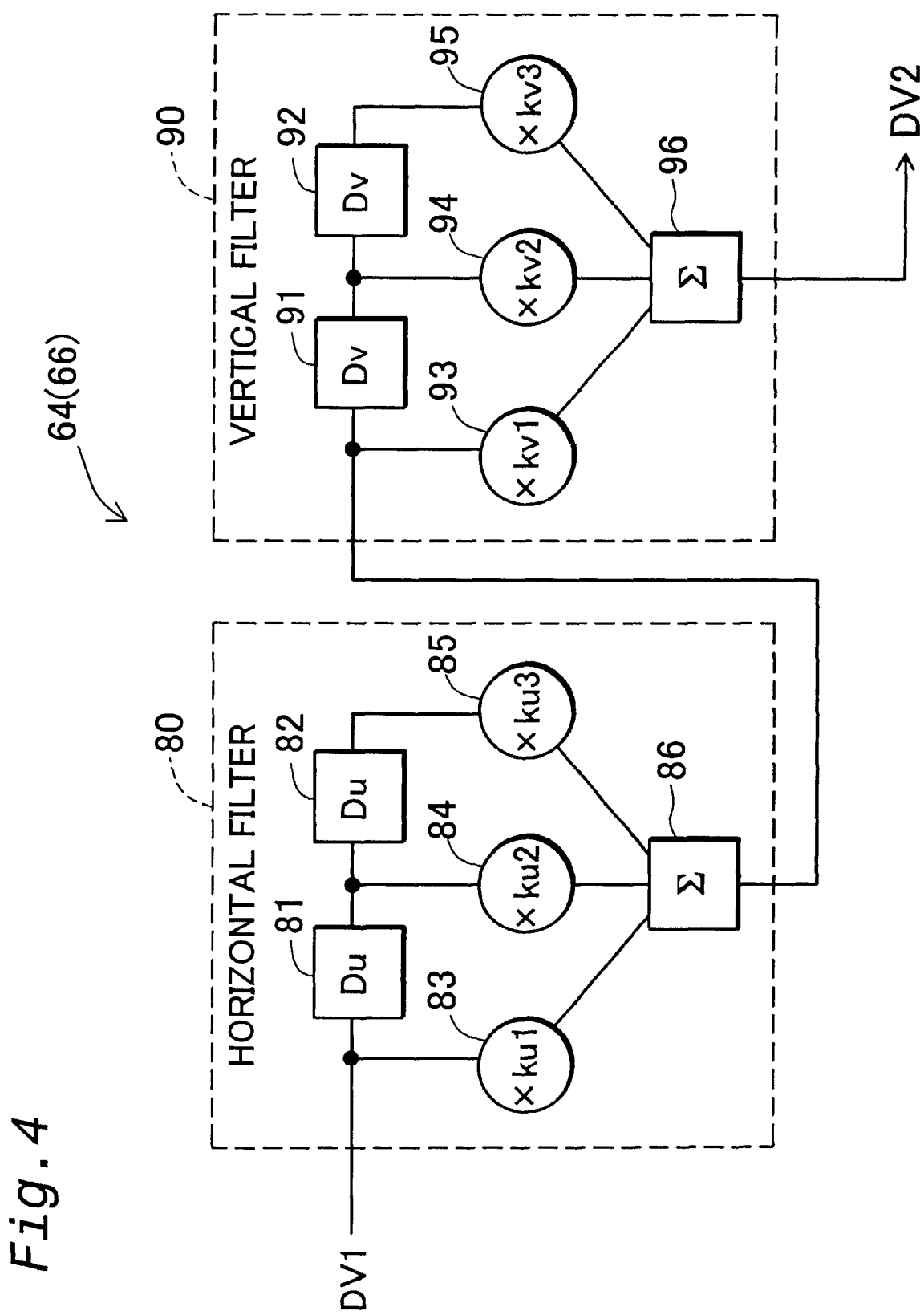
FIG. 4 is a block diagram illustrating the basic internal structure of a first image filtering circuit 64.

FIG. 4 is a block diagram illustrating the basic internal structure of the first image filtering circuit 64. The second image filtering circuit 66 has an identical structure. The first image filtering circuit 64 is a two-dimensional filter in which a horizontal filter 80 and a vertical filter 90 are connected in series. The horizontal filter 80 is a 3-tap FIR filter (finite impulse response filter) including two horizontal delay circuits 81 and 82, three multipliers 83 through 85, and an adder 86. The vertical filter 90 has a similar structure to that of the horizontal filter 80. An amount of delay Du in the horizontal delay circuits 81 and 82 included in the horizontal filter 80 corresponds to one pixel, whereas an amount of delay Dv in vertical delay circuits 91 and 92 included in the vertical filter 90 corresponds to one scanning line.

Values ku1 through ku3 and kv1 through kv3 that are multipliers used in the multipliers 83 through 85 and 93 through 95 constitute one set of filtering coefficients. Plural sets of first filtering coefficients and plural sets of second filtering coefficients that respectively actualize a plurality of first image filters and a plurality of second image filters having different frequency characteristics are stored in the RAM 74 shown in FIG. 2. A variety of image filters having different frequency characteristics are actualized by varying the values of the filtering coefficients ku1 through ku3 and kv1 through kv3.

For example, the low pass filter is actualized by the following filtering coefficients:

$ku1=ku3=kv1=kv3=¼$;

and $ku2=kv2=½$.

The high pass filter is actualized by the following filtering coefficients:

$ku1=ku3=kv1=kv3=-¼$;

and $ku2=kv2=½$.

In the example of FIG. 4, the horizontal filter 80 and the vertical filter 90 are respectively constructed as the 3-tap FIR filters. In practical use, the preferable number of taps in each FIR filter ranges from 16 to 512. Using the filter having a greater number of taps ensures a diversity of filtering characteristics. The number of taps in the horizontal filter 80 may be identical with or different from the number of taps in the vertical filter 90. Digital filters other than the FIR filter are also applicable for the image filters.

The first and the second image filtering circuits 64 and 66 and the RAM 74, in which the first filtering coefficients and the second filtering coefficients used in the respective circuits 64 and 66 are stored, shown in FIG. 2 correspond to the filtering section of the present invention.

Referring back again to FIG. 2, the contrast compensation circuit 68 compensates the contrast of the digital video signal DV3, which has undergone the filtering processes carried out in the two image filtering circuits 64 and 66, and outputs a compensated digital video signal DV4. The compensation improves the contrast of the image, which is lowered by the filtering process. The contrast compensation circuit 68 compensates the contrast of the given digital video signal based on a variety of contrast compensation characteristics. A plurality of contrast compensation values, which specify the contrast compensation characteristic, are stored in the RAM 74 shown in FIG. 2. In the specification hereof, the term 'compensation of the contrast' is synonymous with the 'adjustment of the contrast'.

The contrast compensation circuit 68 and the RAM 74, in which the contrast compensation values used in the circuit 68 are stored, shown in FIG. 2 correspond to the contrast compensation section of the present invention.

FIGS. 5(a) through 5(e) show examples of the digital video signals DV0 through DV4. FIG. 5(a) shows a digital video signal DV0 representing an original image. The digital video signal DV0 includes a pixel area A1 having relatively low spatial frequencies (shown on the left side) and a pixel area A2 having relatively high spatial frequencies (shown on the right side). The pixel area A2 includes signals representing the line images in the horizontal direction of FIG. 3(a). The following description mainly regards six pixels DG1 through DG6 having relatively large pixel values.

FIG. 5(b) shows a digital video signal DV1 representing an interpolated image. In the same manner as FIG. 5(a), the right side of the digital video signal DV1 shown in FIG. 5(b) includes signals representing the line images in the horizontal direction of FIG. 3(b). The pixel area A2 having relatively high spatial frequencies includes 'gray' pixels DG4 and DG6 created by the interpolating process. Comparison between the two digital video signals DV0 and DV1 shows that pixel information regarding pixels in the original image is left in the interpolated image. The distribution of the pixel values in the interpolated image, however, does not accurately reproduce the distribution of the pixel values in the original image.

FIG. 5(c) shows a digital video signal DV2 output from the first image filtering circuit 64. As described above, the first image filtering circuit 64 functions as the LPF. Comparison between the two digital video signals DV1 and DV2 shows that the pixel values are substantially kept unchanged in the pixel area A1 having relatively low spatial frequencies but are varied in the pixel area A2 having relatively high spatial frequencies. In the concrete example, the pixel values of the pixels DG3 through DG6 included in the pixel area A2 are regulated to be substantially identical with one another. The pixel values between the pixels DG2 and DG3, between the pixels DG3 and DG4, and between the pixels DG4 and DG5 are slightly increased.

FIG. 5(d) shows a digital video signal DV3 output from the second image filtering circuit 66. As described above, the second image filtering circuit 66 functions as the HPF. Comparison between the two digital video signals DV2 and DV3 shows that the pixel values are substantially kept unchanged in the pixel area A2 having relatively high spatial frequencies but are varied in the pixel area A1 having relatively low spatial frequencies. In the concrete example, the pixel values of the pixels DG1 and DG2 included in the pixel area A1 are regulated to be substantially identical with the pixel values of the pixels DG3 through DG6 included in the pixel area A2.

Execution of the filtering process regulates the distribution of the pixel values in the interpolated image to a distribution similar to the distribution of the pixel values in the original image. In the concrete example, the filtering process reduces the difference between the pixel values of the pixels DG4 and DG6, which are varied by the interpolating process, and the pixel values of the other pixels DG0 through DG3 and DG5, which are not varied by the interpolating process.

FIG. 5(e) shows a digital video signal DV4 output from the contrast compensation circuit 68. The contrast compensation circuit 68 enhances the contrast of the digital video signal DV3 (FIG. 5(d)) lowered by the filtering process. As clearly understood from the comparison between FIGS. 5(a) and 5(e), the digital video signal DV0 representing the original image (FIG. 5(a)) is practically reproduced by the digital video signal DV4.

The adjustment of the contrast in FIG. 5(e) is based on the contrast compensation characteristic. In the case where each pixel included in the digital video signal DV3 (FIG. 5(d)) has a pixel value of greater than a first pixel value L1, the adjustment causes the pixel to have the maximum pixel value. In the case where each pixel has a pixel value of smaller than a second pixel value L2, the adjustment causes the pixel to have the minimum pixel value.

Figure 6:
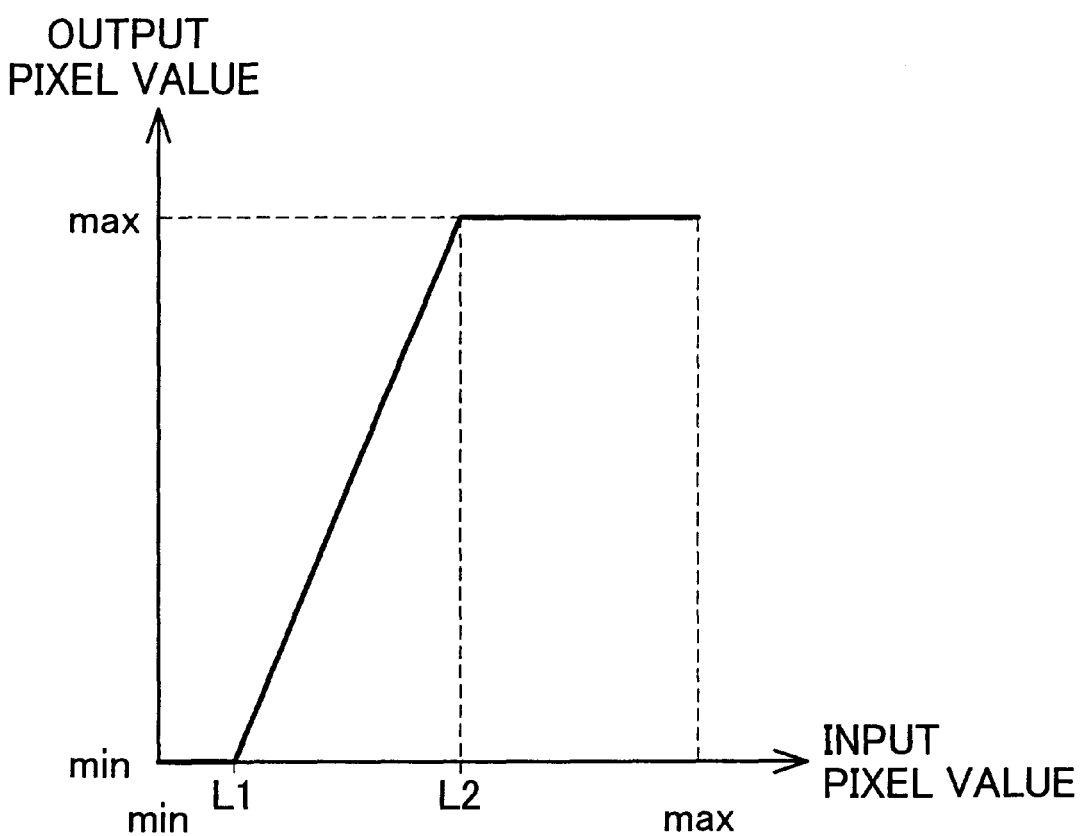
FIG. 6 shows characteristics of input and output pixel values in a contrast compensation circuit 68 (that is, contrast compensation characteristics)

FIG. 6 shows characteristics of input and output pixel values in the contrast compensation circuit 68 (that is, the contrast compensation characteristics). The contrast compensation characteristics shown in FIG. 6 varies linearly in the range of the input pixel value of L1 to L2, and the output pixel value abruptly increases with the linear variation in input pixel value. The compensation of the contrast of the image based on such contrast compensation characteristics desirably recovers or compensates the contrast of the image, which is lowered by the filtering process. The contrast compensation characteristics are not restricted to those shown in FIG. 6 but may be varied in a curve.

In the technique of this embodiment, the first filtering coefficients used in the first image filtering circuit 64, the second filtering coefficients used in the second image filtering circuit 66, and the contrast compensation values specifying the contrast compensation characteristics used in the contrast compensation circuit 68 are mapped to one another in advance and stored in the RAM 74 (FIG. 2).

Figures 7, 8:
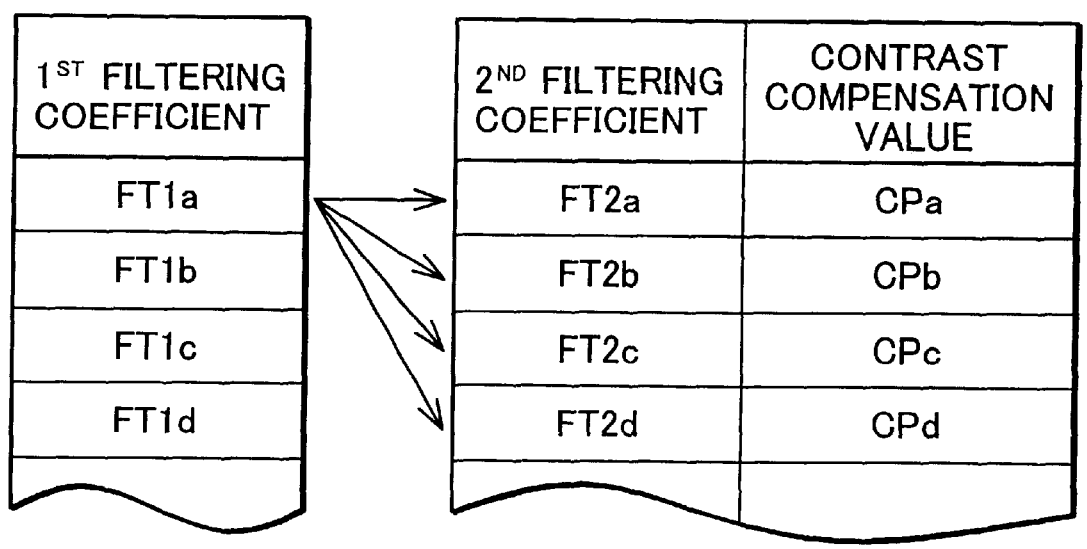
FIG. 7 is a map showing the relationship among the first filtering coefficient, the second filtering coefficient, and the contrast compensation value stored in a RAM 74.
FIG. 8 is a map showing another relationship among the first filtering coefficient, the second filtering coefficient, and the contrast compensation value.

FIG. 7 is a map showing the relationship among the first filtering coefficient, the second filtering coefficient, and the contrast compensation value stored in the RAM 74. In the map of FIG. 7, each of FT1a, FT1b, . . . , represent one set of filtering coefficients used in the first image filtering circuit 64. Each of FT2a, Ft2b, . . . , represents one set of filtering coefficients used in the second image filtering circuit 66. Each of CPa, CPb, . . . , represents one set of contrast compensation values specifying the contrast compensation characteristics as shown in FIG. 6.

For example, when the user selects a first setting ADJ1, 'FT1a', 'FT2a', and 'CPa' are respectively selected as the first filtering coefficient, the second filtering coefficient, and the contrast compensation coefficient. Selection is carried out in a similar manner when the user selects any one of other settings ADJ2, ADJ3, ADJ4, . . . . In the technique of this embodiment, the first filtering coefficient, the second filtering coefficient, and the contrast compensation value are mutually mapped to one another. According to the user's selection of a desired setting, this arrangement facilitates the specification of the processes carried out in the first and the second image filtering circuits 64 and 66 and the contrast compensation circuit 68. The user can select the desired setting through operations of the remote control 40 (FIG. 1).

In the structure of the embodiment, the first filtering coefficient, the second filtering coefficient, and the contrast compensation value are mutually mapped to one another. But the relationship is not restricted to such mapping. FIG. 8 is a map showing another relationship among the first filtering coefficient, the second filtering coefficient, and the contrast compensation coefficient. In the example of FIG. 8, the set of the second filtering coefficients is mapped to the set of the contrast compensation values, whereas the set of the first filtering coefficients is provided independently. In this case, the set of the first filtering coefficients is selected independently of the sets of the second filtering coefficients and the contrast compensation values. For example, while the first filtering coefficient FT1a is selected, a combination of FT2b and CPb or another combination of FT2c and CPc may be selected as the second filtering coefficient and the contrast compensation value. This arrangement ensures a greater number of processing patterns than the arrangement of FIG. 7.

All the first filtering coefficient, the second filtering coefficient, and the contrast compensation value may be selected independently. This further increases the number of possible processing patterns.

As clearly understood from FIGS. 5(c) through 5(e), however, it is desirable to determine the set of the second filtering coefficient used in the second image filtering circuit 66 corresponding to the digital video signal DV2, that is, the set of the first filtering coefficients used in the first image filtering circuit 64. It is also desirable to determine the set of the contrast compensation values used in the contrast compensation circuit 68 corresponding to the set of the second filtering coefficients used in the second image filtering circuit 66. Like the arrangement of this embodiment (FIG. 7), it is accordingly convenient to mutually map the first filtering coefficient, the second filtering coefficient, and the contrast compensation value to one another.

Referring back again to FIG. 2, the digital video signal DV4 output from the contrast compensation circuit 68 is supplied to the contrast/luminance adjustment circuit 70. The contrast/luminance adjustment circuit 70 functions to adjust the contrast and the luminance of the image. This adjustment specifies the display characteristics of the liquid-crystal panel 32. The adjustment of the contrast carried out in the contrast/luminance adjustment circuit 70 is carried out independently of the adjustment of the contrast in the contrast compensation circuit 68.

The image display apparatus of this embodiment includes the first and the second image filtering circuits 64 and 66 and the contrast compensation circuit 68 to adjust the interpolated image generated by the selective skipping process and the interpolating process. This image display apparatus is applicable to the case that does not vary the resolution of the input image. In this case, the filtering coefficients and the contrast compensation value are set in the respective circuits 64, 66, and 68 to allow the direct transmission of the signals without any processing.

As described above, the image display apparatus of this embodiment includes the first and the second image filtering circuits 64 and 66, which cause the interpolated image, which is generated through the selective skipping process and the interpolating process, to be subjected to the filtering process using the spatial low pass filter and the spatial high pass filter in this sequence. This arrangement regulates the distribution of the pixel values in the interpolated image to a distribution similar to the distribution of the pixel values in the original image, thus relieving potential deterioration of the picture quality.

The present invention is not restricted to the above embodiment or its modifications, but there may be many other modifications, changes, and alterations without departing from the scope or spirit of the main characteristics of the present invention. Some examples of possible modification are given below.

(1) The above embodiment uses the two-dimensional image filters as discussed with FIG. 4. The technique of the present invention is, however, applicable for one-dimensional image filters. A variety of structures other than the FIR filter may be applicable for the image filters. The above embodiment uses the digital filters. The technique of the present invention is, however, applicable for analog filters.

(2) The structure of the above embodiment has the two image filtering circuits 64 and 66 as the filtering section. The filtering section may alternatively have only one image filtering circuit. In accordance with a concrete structure, one set of composite filtering coefficient, which are obtained by combining the filtering coefficients used in the first image filtering circuit 64 with those used in the second image filtering circuit 66, is set in the single image filtering circuit. Compared with the structure using the two image filtering circuits 64 and 66, this structure ensures the higher-speed filtering process. In general, the filtering section causes the interpolated image to be processed with a spatial low pass filter and a spatial high pass filter substantially in this sequence.

(3) The technique of the present invention is applied to contract the input original image both in the horizontal direction and in the vertical direction in the embodiment discussed above. The technique is, however, applicable to contract the input original image in either one of the horizontal direction and the vertical direction.

As discussed in the above embodiment, in the case where the image display apparatus is a projection display apparatus, a keystone distortion often arises in the resulting projected image, based on the positional relationship between the projection display apparatus and the screen SC. The skipping process at the selected positions and the simultaneous interpolating process are executed to correct such a keystone distortion. The technique of the present invention thus effectively relieves potential deterioration of the picture quality.

In general, the procedure of the present invention is applicable to the case of generating an interpolated image by, when a skipping rate of the original image is set in at least one of a horizontal direction and a vertical direction, carrying out a skipping process at selected positions in the at least one of the horizontal direction and the vertical direction and simultaneously carrying out interpolation on non-skipped pixels adjacent to skipped pixel, to undergo an interpolating process.

(4) The above embodiment regards the structure of the projection display apparatus utilizing the transmissive-type liquid crystal panels. The technique of the present invention is also applicable to other projection display apparatuses, which include those utilizing the reflective-type liquid crystal panels, those utilizing micromirror mirror devices (trade mark by Texas Instruments Inc.), and those utilizing CRTs.

The technique of the present invention is applicable to image display apparatuses other than the projection display apparatus, which include image display apparatuses having direct-vision image display sections, such as liquid crystal panels, plasma display panels, and CRTs, and image display apparatuses that display an expanded virtual image, such as head-mount displays.

(5) In the above embodiment, part of the configuration actualized by the hardware may be replaced by the software configuration. On the contrary, part of the configuration actualized by the software may be replaced by the hardware configuration. For example, the functions of the two image filtering circuits 64 and 66 and the contrast compensation circuit 68 shown in FIG. 2 may be attained by computer programs.

Such computer programs are recorded in a recording medium. Available examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, carrier waves for communication, and a variety of other computer readable media.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display apparatus, comprising:
an image adjustment section that adjusts a given original image; and
an image display section that displays the adjusted image, wherein the image adjustment section includes:
an interpolating process section that, when a skipping rate of the original image is set in at least one of a horizontal direction and a vertical direction, carries out a skipping process at selected positions in the at least one of the horizontal direction and the vertical direction, and simultaneously carries out interpolation on non-skipped pixels adjacent to skipped pixel, thereby generating an interpolated image; and
a filtering section that carries out a filtering process on the interpolated image, the filtering process being carried out with a spatial low pass filter and a spatial high pass filter which are used substantially in this sequence.

2. An image display apparatus in accordance with claim 1, wherein the filtering process uses one composite image filter which is obtained by combining the spatial low pass filter with the spatial high pass filter.

3. An image display apparatus in accordance with claim 1, wherein the image adjustment section further includes:
a contrast compensation section that compensates contrast of a resulting image processed by the filtering section, wherein the filtering section includes:
a first image filtering section that carries out a filtering process with the spatial low pass filter; and
a second image filtering section that carries out a filtering process with the spatial high pass filter,
the first image filtering section and the second image filtering section carrying out the filtering process with a selected one of a plurality of first filtering coefficients and a selected one of a plurality of second filtering coefficients, respectively, the selected first filtering coefficient and the selected second filtering coefficient being related to each other,
the contrast compensation section carrying out the compensating with a selected one of a plurality of contrast compensation values, the selected contrast compensation value being related to the selected first and second filtering coefficients,
available combinations of the selected first and second filtering coefficients and the selected contrast compensation value being determined in advance.

4. An image display apparatus in accordance with claim 1, wherein the image adjustment section further includes:
a contrast compensation section that compensates contrast of a resulting image processed by the filtering section, wherein the filtering section includes:
a first image filtering section that carries out a filtering process with the spatial low pass filter; and
a second image filtering section that carries out a filtering process with the spatial high pass filter,
the first image filtering section and the second image filtering section carrying out the filtering process with a selected one of a plurality of first filtering coefficients and a selected one of a plurality of second filtering coefficients, respectively,
the contrast compensation section carrying out the compensating with a selected one of a plurality of contrast compensation values, and
the selected second filtering coefficient and contrast compensation value being related to each other in advance, whereas the first filtering coefficient being selected independently of the second filtering coefficient and the contrast compensation value.

5. An image display apparatus in accordance with claim 1, wherein the image display apparatus is a projection display apparatus that displays a projected image, and
the interpolating process section carries out the skipping process to correct a keystone distortion of the projected image.

6. A method of displaying an image, comprising the steps of:
adjusting a given original image; and
displaying the adjusted image,
wherein the step of adjusting the original image includes the steps of:
when a skipping rate of the original image is set in at least one of a horizontal direction and a vertical direction, carrying out a skipping process at selected positions in the at least one of the horizontal direction and the vertical direction, and simultaneously carrying out interpolation on non-skipped pixels adjacent to skipped pixels, thereby generating an interpolated image; and
carrying out a filtering process on the interpolated image, the filtering process being carried out with a spatial low pass filter and a spatial high pass filter which are used substantially in this sequence.

7. A method of displaying an image in accordance with claim 6, wherein the filtering process uses one composite image filter which is obtained by combining the spatial low pass filter with the spatial high pass filter.

8. A method of displaying an image in accordance with claim 6, wherein the step of adjusting the original image further includes:
compensating contrast of a resulting image processed by the step of carrying out the filtering process,
wherein the step of carrying out filtering process includes:
carrying out a first filtering process with the spatial low pass filter; and
carrying out a second filtering process with the spatial high pass filter,
the first filtering process and the second filtering process being carried out by using a selected one of a plurality of first filtering coefficients and a selected one of a plurality of second filtering coefficients, respectively, the selected first filtering coefficient and the selected second filtering coefficient being related to each other,
the step of compensating contrast being carried out by using a selected one of a plurality of contrast compensation values, the selected contrast compensation value being related to the selected first and second filtering coefficients,
available combinations of the selected first and second filtering coefficients and the selected contrast compensation value being determined in advance.

9. A method of displaying an image in accordance with claim 6, wherein the step of adjusting the original image further includes:
compensating contrast of a resulting image processed by the step of carrying out the filtering process,
wherein the step of carrying out filtering process includes:
carrying out a first filtering process with the spatial low pass filter; and
carrying out a second filtering process with the spatial high pass filter,
the first filtering process and the second filtering process being carried out by using a selected one of a plurality of first filtering coefficients and a selected one of a plurality of second filtering coefficients, respectively,
the step of compensating contrast being carried out by using a selected one of a plurality of contrast compensation values, and
the selected second filtering coefficient and contrast compensation value being related to each other in advance, whereas the first filtering coefficient being selected independently of the second filtering coefficient and the contrast compensation value.

10. A method of displaying an image in accordance with claim 6, wherein the method is for a projection display apparatus that displays a projected image, and
the step of carrying out the skipping process is carried out to correct a keystone distortion of the projected image.

11. An image processing apparatus, comprising:
an image adjustment section that adjusts a given original image,
wherein the image adjustment section includes:
an interpolating process section that, when a skipping rate of the original image is set in at least one of a horizontal direction and a vertical direction, carries out a skipping process at selected positions in the at least one of the horizontal direction and the vertical direction, and simultaneously carries out interpolation on non-skipped pixels adjacent to skipped pixel, thereby generating an interpolated image; and a filtering section that carries out a filtering process on the interpolated image, the filtering process being carried out with a spatial low pass filter and a spatial high pass filter which are used substantially in this sequence.

12. An image processing apparatus in accordance with claim 11, wherein the filtering process uses one composite image filter which is obtained by combining the spatial low pass filter with the spatial high pass filter.

13. An image processing apparatus in accordance with claim 11, wherein the image adjustment section further includes:

a contrast compensation section that compensates contrast of a resulting image processed by the filtering section, wherein the filtering section includes:

a first image filtering section that carries out a filtering process with the spatial low pass filter; and a second image filtering section that carries out a filtering process with the spatial high pass filter, the first image filtering section and the second image filtering section carrying out the filtering process with a selected one of a plurality of first filtering coefficients and a selected one of a plurality of second filtering coefficients, respectively, the selected first filtering coefficient and the selected second filtering coefficient being related to each other, the contrast compensation section carrying out the compensating with a selected one of a plurality of contrast compensation values, the selected contrast compensation value being related to the selected first and second filtering coefficients, available combinations of the selected first and second filtering coefficients and the selected contrast compensation value being determined in advance.

14. An image processing apparatus in accordance with claim 11, wherein the image adjustment section further includes:

a contrast compensation section that compensates contrast of a resulting image processed by the filtering section, wherein the filtering section includes:

a first image filtering section that carries out a filtering process with the spatial low pass filter; and a second image filtering section that carries out a filtering process with the spatial high pass filter, the first image filtering section and the second image filtering section carrying out the filtering process with a selected one of a plurality of first filtering coefficients and a selected one of a plurality of second filtering coefficients, respectively, the contrast compensation section carrying out the compensating with a selected one of a plurality of contrast compensation values, and the selected second filtering coefficient and contrast compensation value being related to each other in advance, whereas the first filtering coefficient being selected independently of the second filtering coefficient and the contrast compensation value.

15. An image processing apparatus in accordance with claim 11, wherein the image processing apparatus is a projection display apparatus that displays a projected image, and the interpolating process section carries out the skipping process to correct a keystone distortion of the projected image.

16. A method of processing an image, comprising the step of:

adjusting a given original image, wherein the step of adjusting the original image includes the steps of:

when a skipping rate of the original image is set in at least one of a horizontal direction and a vertical direction, carrying out a skipping process at selected positions in the at least one of the horizontal direction and the vertical direction, and simultaneously carrying out interpolation on non-skipped pixels adjacent to skipped pixels, thereby generating an interpolated image; and carrying out a filtering process on the interpolated image, the filtering process being carried out with a spatial low pass filter and a spatial high pass filter which are used substantially in this sequence.

17. A method of processing an image in accordance with claim 16, wherein the filtering process uses one composite image filter which is obtained by combining the spatial low pass filter with the spatial high pass filter.

18. A method of processing an image in accordance with claim 16, wherein the step of adjusting the original image further includes:

compensating contrast of a resulting image processed by the step of carrying out the filtering process, wherein the step of carrying out filtering process includes:

carrying out a first filtering process with the spatial low pass filter; and carrying out a second filtering process with the spatial high pass filter, the first filtering process and the second filtering process being carried out by using a selected one of a plurality of first filtering coefficients and a selected one of a plurality of second filtering coefficients, respectively, the selected first filtering coefficient and the selected second filtering coefficient being related to each other, the step of compensating contrast being carried out by using a selected one of a plurality of contrast compensation values, the selected contrast compensation value being related to the selected first and second filtering coefficients, available combinations of the selected first and second filtering coefficients and the selected contrast compensation value being determined in advance.

19. A method of processing an image in accordance with claim 16, wherein the step of adjusting the original image further includes:

compensating contrast of a resulting image processed by the step of carrying out the filtering process, wherein the step of carrying out filtering process includes:

carrying out a first filtering process with the spatial low pass filter; and carrying out a second filtering process with the spatial high pass filter, the first filtering process and the second filtering process being carried out by using a selected one of a plurality of first filtering coefficients and a selected one of a plurality of second filtering coefficients, respectively, the step of compensating contrast being carried out by using a selected one of a plurality of contrast compensation values, and the selected second filtering coefficient and contrast compensation value being related to each other in advance, whereas the first filtering coefficient being selected independently of the second filtering coefficient and the contrast compensation value.

20. A method of processing an image in accordance with claim 16, wherein the method is for a projection display apparatus that displays a projected image, and the step of carrying out the skipping process is carried out to correct a keystone distortion of the projected image.

21. A computer program product for processing an image, comprising:

a computer readable medium; and a computer program, stored on the computer readable medium, for adjusting a given original image, wherein the computer program includes:

a program for causing a computer, when a skipping rate of the original image is set in at least one of a horizontal direction and a vertical direction, to carry out a skipping process at selected positions in the at least one of the horizontal direction and the vertical direction, and simultaneously to carry out interpolation on non-skipped pixels adjacent to skipped pixels, thereby generating an interpolated image; and a program for causing the computer to carry out a filtering process on the interpolated image, the filtering process being carried out with a spatial low pass filter and a spatial high pass filter which are used substantially in this sequence.

22. A computer program in accordance with claim 21, wherein the filtering process uses one composite image filter which is obtained by combining the spatial low pass filter with the spatial high pass filter.

23. A computer program in accordance with claim 21, wherein the program for adjusting the given original image further includes:

a program for causing the computer to compensate contrast of a resulting image processed by the program for carrying out the filtering process, wherein the program for carrying out filtering process includes:

a program for causing the computer to carry out a first filtering process with the spatial low pass filter; and a program for causing the computer to carry out a second filtering process with the spatial high pass filter, the first filtering process and the second filtering process being carried out by using a selected one of a plurality of first filtering coefficients and a selected one of a plurality of second filtering coefficients, respectively, the selected first filtering coefficient and the selected second filtering coefficient being related to each other, the program for compensating contrast being carried out by using a selected one of a plurality of contrast compensation values, the selected contrast compensation value being related to the selected first and second filtering coefficients, available combinations of the selected first and second filtering coefficients and the selected contrast compensation value being determined in advance.

24. A computer program in accordance with claim 21, wherein the program for adjusting the given original image further includes:

a program for causing the computer to compensate contrast of a resulting image processed by the program for carrying out the filtering process, wherein the program for carrying out filtering process includes:

a program for causing the computer to carry out a first filtering process with the spatial low pass filter; and a program for causing the computer to carry out a second filtering process with the spatial high pass filter, the first filtering process and the second filtering process being carried out by using a selected one of a plurality of first filtering coefficients and a selected one of a plurality of second filtering coefficients, respectively, the program for compensating contrast being carried out by using a selected one of a plurality of contrast compensation values, and the selected second filtering coefficient and contrast compensation value being related to each other in advance, whereas the first filtering coefficient being selected independently of the second filtering coefficient and the contrast compensation value.

25. A computer program in accordance with claim 21, wherein the computer is a projection display apparatus that displays a projected image, and the program for carrying out the skipping process is carried out to correct a keystone distortion of the projected image.

* * * * *